US010807537B2

(12) United States Patent
Englert et al.

(10) Patent No.: US 10,807,537 B2
(45) Date of Patent: Oct. 20, 2020

(54) COVERING DEVICE

(71) Applicant: ILLINOIS TOOL WORKS INC., Glenview, IL (US)

(72) Inventors: Markus Englert, Homburg (DE); Joachim Pestke, Enkenbach-Alsenborn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 80 days.

(21) Appl. No.: 16/037,318

(22) Filed: Jul. 17, 2018

(65) Prior Publication Data
US 2019/0031109 A1    Jan. 31, 2019

(30) Foreign Application Priority Data

Jul. 27, 2017    (DE) .................... 10 2017 116 999

(51) Int. Cl.
| *B60R 5/04* | (2006.01) |
| *B60R 7/04* | (2006.01) |
| *E05C 9/00* | (2006.01) |

(52) U.S. Cl.
CPC ............... *B60R 5/048* (2013.01); *B60R 7/04* (2013.01); *E05C 9/002* (2013.01)

(58) Field of Classification Search
CPC ........... B60R 5/048; B60R 7/04; E05C 9/002
USPC .................................................. 220/254.9
See application file for complete search history.

(56) References Cited

U.S. PATENT DOCUMENTS

| 4,819,829 | A | * | 4/1989 | Rosten | .................. | B65D 5/727 |
| | | | | | | 220/254.9 |
| 6,883,852 | B2 | | 4/2005 | Laskey | | |
| 7,287,795 | B1 | | 10/2007 | Thomas | | |
| 2002/0005424 | A1 | | 1/2002 | Lange | | |
| 2002/0030375 | A1 | * | 3/2002 | Eguchi | ..................... | B60R 7/04 |
| | | | | | | 296/37.8 |
| 2004/0130174 | A1 | * | 7/2004 | Laskey | ................. | B60N 3/102 |
| | | | | | | 296/37.1 |
| 2011/0049157 | A1 | * | 3/2011 | Nakamura | ............... | B60R 7/04 |
| | | | | | | 220/345.1 |

FOREIGN PATENT DOCUMENTS

| DE | 102008015161 | 9/2009 | | |
| WO | WO-2013186484 A1 | * | 12/2013 | ............. B60N 3/105 |

* cited by examiner

*Primary Examiner* — James N Smalley
(74) *Attorney, Agent, or Firm* — Thompson Hine LLP

(57) ABSTRACT

A covering device for a storage compartment of a vehicle includes a cover that is slidably mounted for movement between a closed position and an open position. An actuating element is arranged on the cover for manually actuating the cover to be moved along a movement direction between the closed position and the open position. In the closed position a latching part of the cover engages a projection to lock the cover in the closed position. A spring bias is provided to bias the latching part of the cover into engagement with the projection when the cover is in the closed position. The latching part and the projection are engaged in such a way that a locking action of the latching part on the projection is released by manual actuation of the actuating element in the movement direction.

15 Claims, 2 Drawing Sheets

COVERING DEVICE

TECHNICAL FIELD

The invention relates to a covering device for a compartment, in particular a storage compartment of a vehicle, comprising a cover which is mounted on bearing means such that it can be moved between a closed position which closes the compartment and an open position which opens the compartment, comprising an actuating element which is arranged on the cover and by way of the manual actuation of which the cover can be moved along a movement direction between the closed position and the open position, and comprising locking means which lock the cover in the closed position against a movement into the open position.

BACKGROUND

Storage compartments in cars are closed by way of covering devices of this type. Loose objects can be deposited in the storage compartments. In the case of an accident of the vehicle, it is to be prevented that the closed cover moves into the open position as a result of forces which occur during the accident, with the result that objects from the compartment can injure vehicle occupants. To this end, locking devices are already known in the prior art, which locking devices are to lock the cover against unintentional opening in the case of an accident.

For example, DE 10 2008 015 161 A1 has disclosed a locking device having a locking element which is mounted such that it can be pivoted between a position which locks the cover and a position which releases the cover. The known locking device is structurally complicated, however. Moreover, a user first of all has to perform a separate unlocking movement of the locking element, in order to be able subsequently to open the cover.

A further locking device is known from U.S. Pat. No. 7,287,795 B1. In the case of said locking device, the cover first of all has to be pressed in in the direction of the compartment, in order to release the locking action. The cover can be moved into the open position only subsequently. Moreover, said locking device is also structurally complicated.

A further locking device is known from U.S. Pat. No. 6,883,852 B2. Here, the cover has an actuating handle, in the case of the actuation of which in the opening direction of the cover tilting of the cover about a tilting axis occurs, as a result of which in turn the locking action is released. Here, the forces which are required for the unlocking action are predefined by way of the material and/or the geometry of the cover. There is therefore only low flexibility with regard to the configuration of the cover.

A further covering device is known from US 2002/005424 A1.

SUMMARY

Proceeding from the described prior art, the invention is based on the object of providing a covering device of the type mentioned at the outset, which covering device is of structurally simple configuration with great flexibility with regard to the configuration of the cover, permits user-friendly operation, and ensures a reliable locking action of the cover in the process.

The invention achieves the object by way of the subject matter of claim 1. Advantageous refinements are found in the dependent claims, the description and the figures.

For a covering device of the type mentioned at the outset, the invention achieves the object by virtue of the fact that spring means are provided which prestress the cover into a locked position in the closed position, and that the locking means are configured in such a way that the locking action of the cover is released in the case of an actuation of the actuating element in the movement direction in order to move the cover out of the closed position into the open position.

The compartment can be a compartment, in particular a storage compartment, of a vehicle, such as a passenger motor vehicle or a truck. Loose objects can be stored in the storage compartment. The covering device according to the invention can also comprise the compartment. Moreover, the covering device can comprise a housing which forms the compartment. Here, the invention also relates to a covering device in the state, in which it is mounted in a vehicle.

The locking device according to the invention reliably prevents that the closed cover can move into the open position as a result of forces which occur in the case of an accident. In particular, it prevents a movement out of the closed position into the open position in the case of a force which occurs in the movement direction of the cover into the open position.

According to the invention, furthermore, spring means are provided which prestress the cover into the locked position in the closed position. A flexible adjustability of the unlocking force is made possible via the spring means. Here, the unlocking force is influenced merely slightly by the material selection of the cover and/or its geometry and the temperature. Unlike in the prior art, a defined stiffness for a sufficient unlocking force does not have to be provided by way of the cover itself. As a result, according to the invention, there is the greatest possible flexibility with regard to the configuration of the cover.

Moreover, the locking device is configured in such a way that, by way of manual actuation of the actuating element in the movement direction of the cover out of the closed position into the open position, first of all the locking action is released and then the cover is moved into the open position. The movement direction can be, in particular, a linear movement direction. No deliberately different movement than the movement for opening the cover is required in order to release the locking action by way of the user. Rather, the movement of the actuating element in the movement direction automatically leads to a pivoting or tilting movement of the free end of the cover, as a result of which the locking action is released. To this end, the free end of the cover can form what is known as a film hinge which permits a corresponding pivoting or tilting movement of the cover.

As a result of the refinement according to the invention, the retaining force in the closed position and the unlocking force for unlocking the cover are independent of one another. This permits the setting of the respective forces in a flexible and individual way. In this way, low and therefore user-friendly unlocking forces can be realized in the case of a high retaining force in the closed position and therefore high locking reliability against opening of the cover in the case of a crash. The force which is to be applied manually in order to release the locking action can be, for example, lower than 10 N. Here, according to the invention, no further separate parts are required for the reliable function in addition to the cover, the spring means and the locking means, for example locking projections. In particular, no separate locking elements are required which have to be moved separately from the movement of the cover. Rather, it is sufficient according to the invention if only the cover moves. The covering device according to the invention is therefore also of structurally simple construction. In addition to the low forces which are required for the unlocking action, the kinematics of the unlocking action also contribute to the high user-friendliness, according to which kinematics the user has to move the cover merely in the desired opening direction and the unlocking action takes place automatically in the process.

According to one particularly practice-oriented refinement, the cover can be configured as a roller blind. It can be rolled up or folded up in the open position or else can be received in a rest position of the covering device. The roller blind can have roller blind slats which are connected pivotably to one another, for example via film hinges.

The actuating element can be an actuating projection which is arranged on that upper side of the cover which faces away from the compartment. Furthermore, the actuating projection can be arranged in the region of a free end of the cover. It can be connected in one piece to the cover. The actuating projection is, in particular, an actuating handle which projects from the upper side of the cover. Said actuating handle can be gripped manually and moved in order to open the cover and to close the cover. Here, the free end of the cover is that end of the cover which moves over the compartment (completely) during the movement between the open position and the closed position. In the case of a manual actuation along the movement direction, a torque on the actuating projection and therefore on the cover then automatically occurs on account of the lever effect. As a result, a pivoting or tilting movement of the actuating projection and therefore of the cover occurs, which movement releases the locking action. As a result of the force which is exerted manually on the actuating handle in the opening movement direction, a movement component of the cover, in particular of its free end, automatically occurs perpendicularly with respect to said opening movement direction, for example upward in the installed state.

It can be provided in accordance with a further refinement that the bearing means have bearing grooves which lie opposite one another and in which the cover is mounted such that it can be displaced along the movement direction between the closed position and the open position by way of bearing journals which are configured on opposite sides of the cover. The bearing grooves can be configured on walls, lying opposite the upper end, of a housing which forms the compartment. On its opposite sides, the cover in each case has a plurality of bearing journals which slide in the bearing grooves during the movement between the closed and open position. As a result, the movement of the cover is guided securely. The bearing journals can be, for example, cylindrical bearing journals. The bearing grooves can have, for example, a rectangular cross section.

It can be provided in accordance with a further refinement that the locking means comprise two locking projections which are arranged on in each case one side wall of one of the bearing grooves, the cover having latching projections which are configured on opposite sides of the cover and engage behind in each case one locking projection in the closed position. In each case one locking projection is configured on the side walls of the bearing grooves which lie opposite one another. These can be, in particular, the lower side walls of the bearing grooves in the mounted state of the covering device. Here, the locking projections can be arranged in each case in the region of an end of the bearing grooves, which end is assigned to the closed position of the cover. The latching projections can be configured on opposite sides of the cover in the region of the free end of the cover. In each case one latching projection then latches behind one of the locking projections. As viewed in the movement direction into the closed position, the latching projections can be configured behind the last bearing journal. They can be of fundamentally identical configuration to the bearing journals. It can be advantageous, however, if the latching projections have a shape which is specially adapted to their latching function. For example, the latching projections can be configured as latching hooks.

It can be provided in accordance with a further refinement that the locking projections are locking ramps, the latching projections being guided over the rising ramp faces of the said locking ramps during the displacement into the closed position, the latching projections engaging, in the closed position, behind the ramp walls which in each case adjoin the end of the ramp faces. The ramps can be, for example, of wedge-shaped configuration. They have a ramp face which rises in the movement direction of the cover into the closed position and preferably forms a plane which is oblique with respect to the movement direction of the cover. The latching projections of the cover slide over said ramp face during the movement of the cover into the closed position. The end of the rising ramp face is adjoined in each case by a ramp wall. The ramp wall forms the connection of the end of the rising ramp face to the side walls of the bearing grooves, which side walls support the locking ramps. The ramp walls can lie in each case in a (two-dimensional) plane. They can also have a curved shape, however. A particularly reliable locking action is effected by way of latching engaging behind of the ramp walls. In particular, in the case of an accident, a force which acts exclusively in the movement direction of the cover into the open position does not lead reliably to opening of the cover. At the same time, simple unlocking is possible by way of a manual movement of the actuating element, since the latching projections carry out a movement component perpendicularly with respect to the movement direction in the course of the actuating element.

For a locking action which is still reliable in the closed position, the latching projections can engage behind the ramp walls in a positively locking manner in the closed position.

In accordance with a further refinement, an upper edge of the ramp walls can lie in each case behind a lower edge of the ramp walls as viewed in the movement direction of the cover into the closed position. Here, the upper edge is the edge which forms the end of the rising ramp face. The lower edge is the edge which forms the connection to the respective side wall of the bearing grooves. In the case of the abovementioned refinement, the upper edge of the ramp walls lies behind the lower edge as viewed in the movement direction of the cover into the closed position. The ramp walls are therefore tilted in the movement direction of the cover into the closed position. They form an undercut, in which the latching projections are then preferably received in a positively locking manner in the closed position. As a result, the ramp walls form a receptacle for the latching projections which ensure even more reliable engaging behind in the closed position. In this way, unintended opening of the cover is prevented in the case of a crash, even in the event of an occurrence of a force component which is perpendicular with respect to the movement direction.

The ramp walls can in each case form an acute angle with the movement direction of the cover. The ramp walls can also in each case form an acute angle with the side walls of the bearing grooves, which side walls have the locking ramps. As has been mentioned, the ramp walls can lie in one plane. Here, the acute angle between the ramp walls and the movement direction lies, in particular, in each case between the respective ramp wall and a straight line which starts from the upper edge of the ramp walls in the movement direction of the cover into the open position. The side walls of the bearing grooves can lie parallel to the movement direction of the cover. The ramp walls are therefore once again tilted in the movement direction of the cover into the closed position, and thus form a receptacle for the latching projections for even more reliable engaging behind in the closed position. Unintended opening of the cover is once again prevented in the case of a crash, in particular even in the event of an occurrence of a force component which is perpendicular with respect to the movement direction.

In accordance with a further refinement, in the closed position, the spring means can press the latching projections onto those side walls of the bearing grooves which have the locking projections. Here, the spring means can comprise two elastic spring arms which press in each case one of the latching projections onto one of the side walls of the bearing grooves. Here, the spring arms can be attached in each case by way of one end pivotably to a side wall which delimits the bearing grooves. The free end then presses the latching projections in the closed position against the side walls which have the locking projections, for example downward in the mounted state of the covering device. During the unlocking action, the spring arms are then deformed elastically in a direction away from the side walls, for example upward in the mounted state, and release the latching projections for the unlocking action.

In accordance with a further refinement, the cover can have a textile or leather covering or a metal component. As has already been mentioned, the use of spring means allows a greatest possible flexibility with regard to the material selection and the thickness of the cover. Thus, for example, textile or leather materials or metal can be used for the cover. It is possible, for example, that the cover has a main body which is made, for example, from a plastic and on the upper side of which, which faces away from the compartment, or on the opposite lower side of which a textile or leather covering or a metal component is provided. It would also be conceivable, however, that the cover is formed completely from a textile or leather covering or from metal. For example, reinforcing elements, such as reinforcing ribs, for example made from plastic, can also be provided, in order to impart the required stability to the cover. Here, the textile or leather components can also form the integral hinge or hinges. Secondly, it would also be possible to manufacture the cover from two plastic components of different hardness. For example, an inner-side harder plastic component might be covered by a softer plastic component which lies on the outside. As a result, the feel of the covering device can be improved.

BRIEF DESCRIPTION OF THE DRAWINGS

One exemplary embodiment of the invention will be described in greater detail in the following text using figures, in which, diagrammatically.

Unless indicated otherwise, identical designations denote identical objects in the figures.

DETAILED DESCRIPTION

Figure 1:
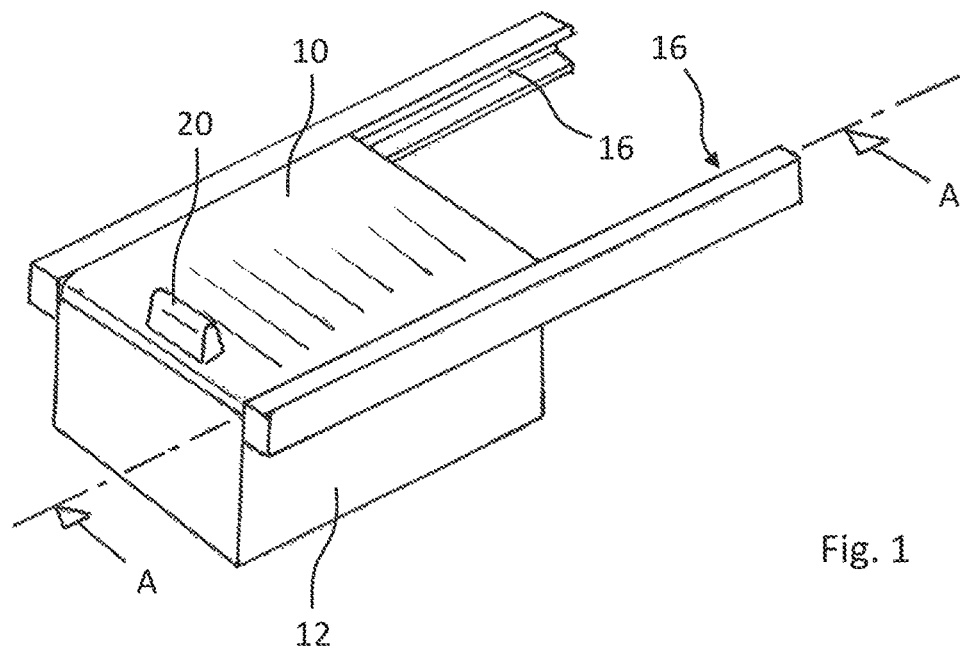
FIG. 1 shows a covering device according to the invention in a perspective view from above.

The covering device according to the invention which is shown in the figures comprises a cover 10 which is configured as a roller blind in the example which is shown. The cover 10 can be displaced between a closed position (shown in FIGS. 1 and 2), in which it closes a compartment which is delimited by way of a housing 12, for example a storage compartment of a vehicle, and an open position (not shown in the figures), in which the cover 10 opens the compartment, along the linear movement direction which is shown at the designation 14 in FIG. 1 in the example which is shown. Bearing grooves 16 which lie opposite one another and preferably have a rectangular cross section are provided to guide the cover 10. On its opposite sides, the cover 10 has a plurality of cylindrical bearing journals 18 which are guided in the bearing grooves 16 during the movement of the cover 10 between its open position and its closed position. In order to actuate the cover 10, the latter has an actuating projection 20 which forms an actuating handle in the present case and is arranged in the region of the free end of said cover 10, the left hand end of said cover 10 in FIGS. 1 and 2, on the upper side which faces away from the compartment. Via said actuating projection 20, the cover 10 can be displaced manually between the closed position and the open position. Moreover, the cover 10 comprises a series of roller blind slats 22. Here, a gripping slat 24 of the roller blind, which gripping slat 24 supports the actuating projection 20, is of somewhat larger configuration than the remaining slats 22. At its free end, moreover, the cover 10 has in each case one latching projection 26 on its opposite sides, which latching projection 26 is configured as latching hook 26 in the example which is shown. Moreover, in each case one locking projection 30 (a wedge-shaped locking ramp 30 in the present case) is arranged on the lower side wall 28 (in the mounted state) of the bearing grooves 16. The locking ramp 30 has a ramp face 32 which rises in the movement direction of the cover 10 out of the open position into its closed position, that is to say to the left in FIG. 2. The end of the rising ramp face 32 is adjoined by a ramp wall 34. In the example which is shown, both the ramp faces 32 and the ramp walls 34 lie in each case in one plane. Otherwise, the bearing grooves 16 including the locking ramps 30 are of identical configuration with respect to one another, merely in a flipped manner about a longitudinal center plane.

Figure 2:
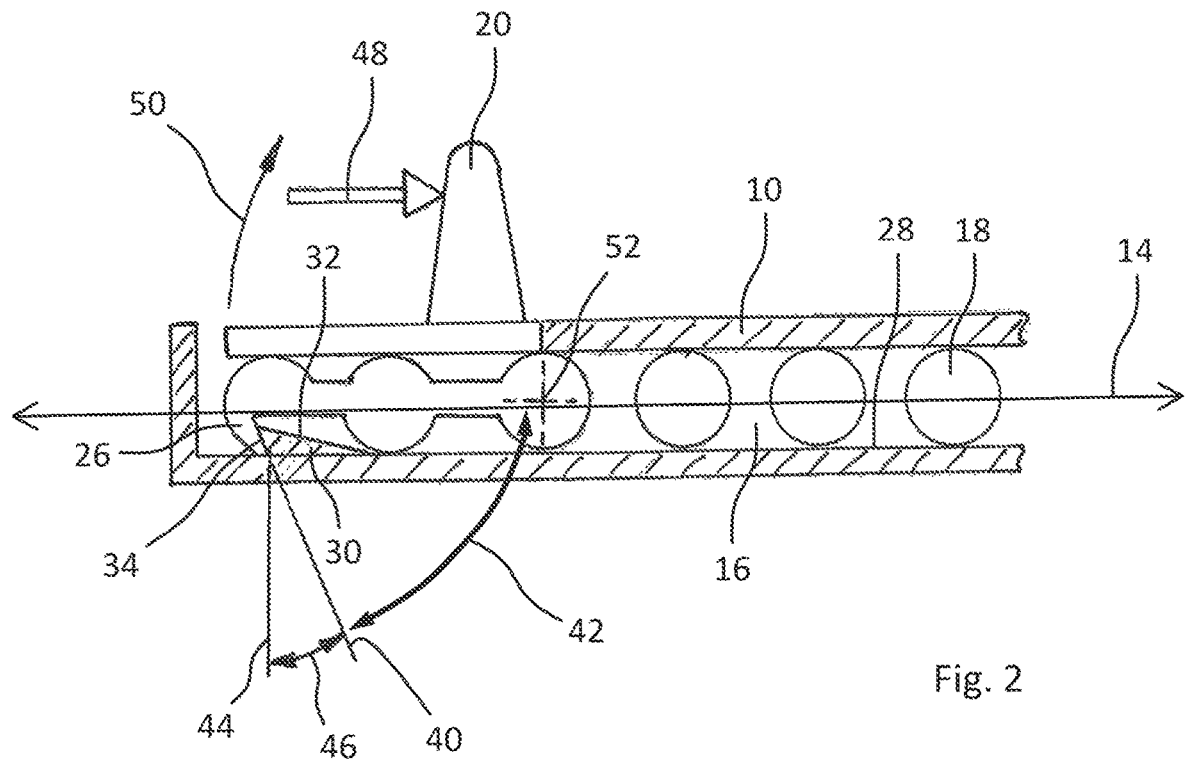
FIG. 2 shows details of a sectional view along the line A-A in FIG. 1.
Figure 3:
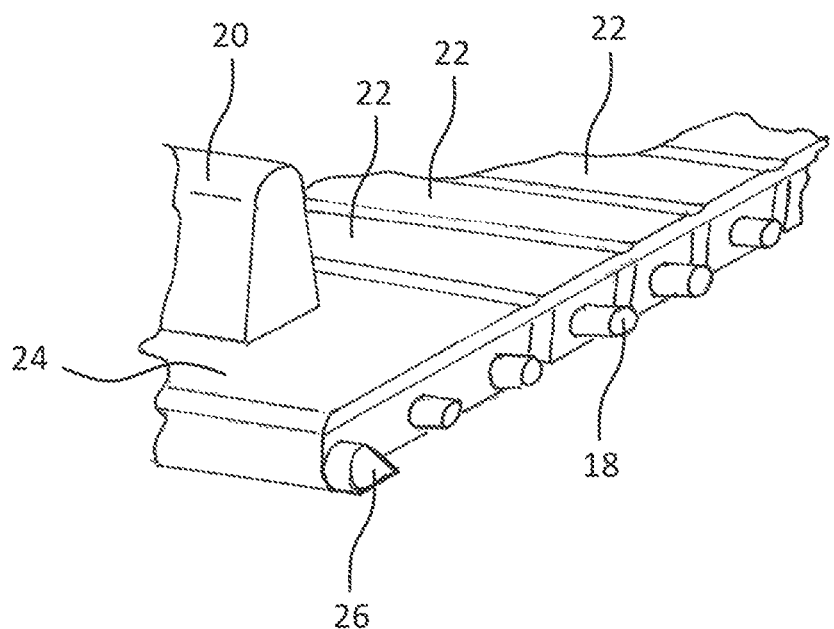
FIG. 3 shows a perspective partial view of the covering device from FIG. 1.

As can be seen, in particular, in FIG. 2, the latching projections 26 engage behind the locking ramps 30 or their ramp walls 34 in the closed position which is shown in FIG. 2. In said closed position, the cover 10 is locked securely against a displacement into the open position, for example in the case of a force which occurs in the case of a crash of the vehicle along the movement direction 14 (to the right in FIG. 2). Moreover, it can be seen in FIGS. 2 and 4 that the upper edge 36 of the ramp wall 34 lies behind the lower edge 38 of the ramp wall 34 as viewed in the movement direction 14 of the cover 10 out of the open position into the closed position (that is to say from the right to the left in FIG. 2). Therefore, the ramp wall 34 is tilted in the movement direction 14 of the cover 10 into the closed position into a plane which is illustrated at the designation 40 in FIG. 2. Said plane 40, in which the ramp wall 34 lies, encloses an acute angle 42 with the movement direction 14, in particular a straight line which emanates, starting from the upper edge 36, in the movement direction 14 of the cover 10 into the open position (that is to say to the right in FIG. 2). With respect to a plane 44 which lies perpendicularly on the movement direction 14, the ramp wall 34 encloses a negative angle 46. Moreover, the ramp wall 34 encloses an acute angle with the side wall 28, as viewed counter to the clockwise direction starting from the upper edge 36 in FIG. 2. As a result of said arrangement of the ramp wall 34, a release of the locking action in the case of an occurrence of a force which acts perpendicularly with respect to the movement direction 14 (upward in FIG. 2) in the case of a crash is also prevented in the closed position which is shown in FIG. 2.

In order to open the cover 10 from the closed position which is shown in FIG. 2, an opening force is exerted manually on the actuating projection 20 in the movement direction 14, as shown in FIG. 2 at the arrow 48. On account of the lever effect, this leads to a torque on the cover 10, as illustrated by way of the arrow 50 in FIG. 2. As a result, the latching projections 26 are released from the engagement with the locking ramps 30, slight pivoting of the cover 10 occurring, for example about the pivot axis which is shown at the designation 52 in FIG. 2. Pivoting can of course also take place about another pivot axis, for example formed by way of an integral hinge or roller blind hinge which is formed by way of the cover 10. The cover 10 can then be displaced into the open position (to the right in FIG. 2) by way of further exertion of a force in the direction of the arrow 48 in FIG. 2. Here, no other exertion of force by way of the operator is required than along the arrow 48. Solely said exertion of force leads automatically to pivoting of the cover 10 and therefore an unlocking action.

Figure 4:
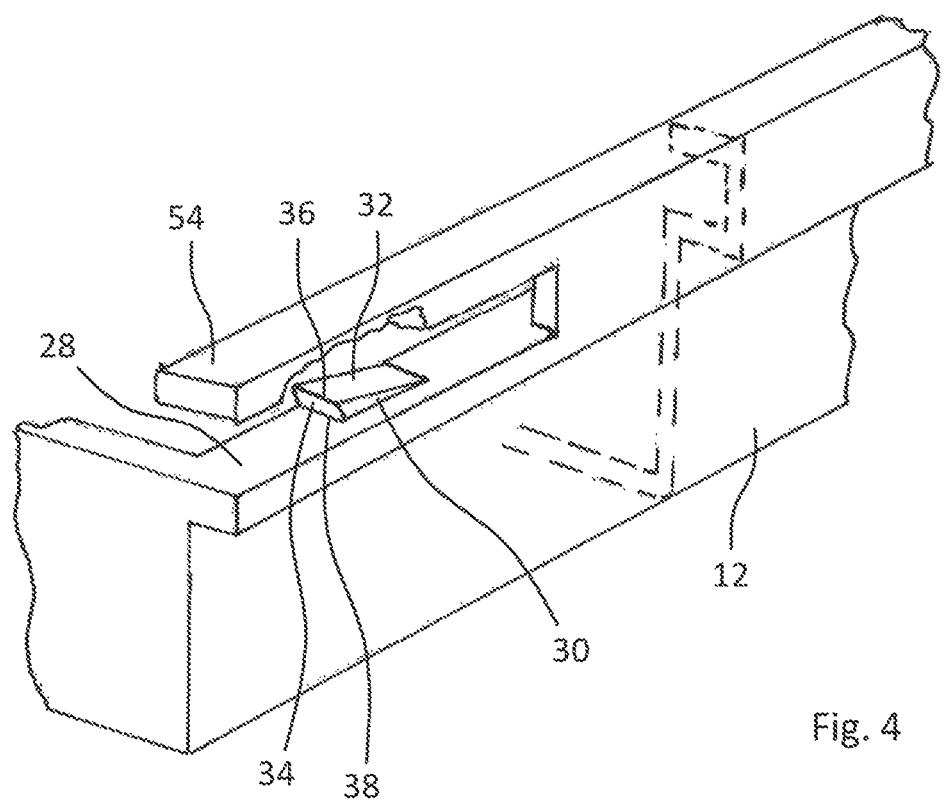
FIG. 4 shows details of a further partially sectioned view of the covering device from FIG. 1.

An elastic spring arm 54 can also be seen in FIG. 4, which elastic spring arm 54 presses the latching projections 26 against the side wall 28 of the bearing grooves 16 in the closed position (that is to say downward in FIGS. 2 and 4). The unlocking of the cover 10, in particular the pivoting about the pivot axis 52, therefore takes place under elastic deformation of the spring arms 54 (upward in FIG. 4), counter to the spring prestress of the spring arms 54. The force which is required for the unlocking action can be set flexibly in the desired way by way of the spring arms 54, to be precise in a merely slightly dependent manner on the material selection, the thickness and the temperature of the cover 10. Therefore, the material and the geometry of the cover 10 can fundamentally be selected freely. It is thus conceivable, for example, that the cover 10 has a textile or leather covering or a metal component which is applied to the slats 22 of the cover 10.

In order to move the cover 10 back into the closed position, a force is exerted manually on the actuating projection 20 in the opposite direction to the arrow 48. When the locking ramps 30 are reached, the latching projections 26 then first of all slide over the ramp faces 32 before they engage behind the ramp walls 34 again in the closed position in the state which is shown in FIG. 2.

LIST OF DESIGNATIONS

10 Cover
12 Housing
14 Movement direction
16 Bearing grooves
18 Bearing journals
20 Actuating projection/Actuating handle
22 Blind slats
24 Gripping slat
26 Latching projection/latching hook
28 Side wall
30 Locking projection/locking ramp
32 Ramp face
34 Ramp wall
36 Upper edge
38 Lower edge
40 Plane
42 Acute angle
44 Plane
46 Negative angle
48 Arrow
50 Arrow
52 Pivot axis
54 Spring arm

What is claimed is:

1. A covering device for a storage compartment of a vehicle, comprising a cover (10) which is mounted on bearing means such that it can be moved between a closed position which closes the storage compartment and an open position which opens the storage compartment, comprising an actuating element which is arranged on the cover (10) and by way of the manual actuation of which the cover (10) can be moved along a movement direction (14) between the closed position and the open position, and comprising locking means which lock the cover (10) in the closed position against a movement into the open position, characterized in that spring means are provided which prestress the cover (10) into a locked position in the closed position, and in that the locking means are configured in such a way that the locking action of the cover (10) is released in the case of an actuation of the actuating element in the movement direction (14) in order to move the cover (10) out of the closed position into the open position;
   wherein the bearing means have bearing grooves (16) which lie opposite one another and in which the cover (10) is mounted such that it can be displaced along the movement direction (14) between the closed position and the open position by way of bearing journals (18) which are configured on opposite sides of the cover (10);
   wherein the locking means comprise two locking projections (30) which are arranged on in each case one side wall (28) of one of the bearing grooves (16), the cover (10) having latching projections (26) which are configured on opposite sides of the cover (10) and engage behind in each case one locking projection (30) in the closed position.

2. The covering device according to claim 1, characterized in that the cover (10) is configured as a roller blind.

3. The covering device according to claim 1, characterized in that the actuating element is an actuating projection (20) which is arranged on that upper side of the cover (10) which faces away from the storage compartment.

4. The covering device according to claim 3, characterized in that the actuating projection (20) is arranged in the region of a free end of the cover (10).

5. The covering device according to claim 1, characterized in that the locking projections (30) are locking ramps (30), the latching projections (26) being guided over the rising ramp faces (32) of the said locking ramps (30) during the displacement into the closed position, the latching projections (26) engaging, in the closed position, behind the ramp walls (34) which in each case adjoin the end of the ramp faces (32).

6. The covering device according to claim 5, characterized in that the latching projections (26) engage behind the ramp walls (34) in a positively locking manner in the closed position.

7. The covering device according to claim 6, characterized in that an upper edge (36) of the ramp walls (34) lies in each case behind a lower edge (38) of the ramp walls (34) as viewed in the movement direction (14) of the cover (10) into the closed position.

8. The covering device according to claim 5, characterized in that the ramp walls (34) in each case form an acute angle (42) with the movement direction (14) of the cover (10).

9. The covering device according to claim 5, characterized in that the ramp walls (34) in each case form an acute angle with those side walls (28) of the bearing grooves which have the locking ramps (30).

10. The covering device according to claim 1, characterized in that, in the closed position, the spring means press the latching projections onto those side walls (28) of the bearing grooves (16) which have the locking projections (30).

11. The covering device according to claim 10, characterized in that the spring means comprise two elastic spring arms (54) which press in each case one of the latching projections (26) onto one of the side walls (28) of the bearing grooves (16).

12. The covering device according to claim 1, characterized in that the cover (10) has a textile or leather covering or a metal component.

13. A covering device for a storage compartment of a vehicle, comprising: a cover that is slidably mounted for movement between a closed position which closes the storage compartment and an open position which opens the storage compartment, wherein an actuating element is arranged on the cover for manually actuating the cover to be moved along a movement direction between the closed position and the open position, and in the closed position spaced apart latching parts on opposite sides of the cover engage spaced apart projections to lock the cover in the closed position against a movement into the open position, wherein spring means are provided which biases the latching parts of the cover into engagement with the projections when the cover is in the closed position, and wherein the latching parts and the projections are engaged in such a way that a locking action of the latching parts on the projections is released by manual actuation of the actuating element in the movement direction in order to move the cover out of the closed position into the open position;

wherein the spring means comprise two spaced apart elastic spring arms which press, in each case, one of the latching parts downward toward one of the projections when the cover is in the closed position.

14. The covering device of claim 13 wherein manual action of the actuating element in the movement direction produces a torque on the cover to pivot or tilt the latching part out of engagement with the projection.

15. A covering device for a storage compartment of a vehicle, comprising:

spaced apart first and second bearing grooves, the first bearing groove having a first latching projection and the second bearing groove having a second latching projection; and a cover with opposite first and second sides slidably mounted in the first and second bearing grooves for movement between a closed position which closes the storage compartment and an open position which opens the storage compartment, wherein an actuating element is arranged on the cover for manually actuating the cover to be moved along a movement direction between the closed position and the open position, wherein, in the closed position, a first latching part on the first side of the cover engages the first latching projection in the first bearing groove and a second latching part on the second side of the cover engages the second latching projection in the second bearing groove, to lock the cover in the closed position against a movement into the open position; and spaced apart first and second elastic spring arms, wherein, when the cover is in the closed position, the first elastic spring arm presses the first latching part toward the first latching projection and the second elastic spring arm presses the second latching part toward the second latching projection.

* * * * *